(12) United States Patent
Stabler

(10) Patent No.: US 7,253,353 B2
(45) Date of Patent: Aug. 7, 2007

(54) THERMOELECTRIC AUGMENTED HYBRID ELECTRIC PROPULSION SYSTEM

(75) Inventor: Francis R. Stabler, Troy, MI (US)

(73) Assignee: General Motors Corporation, Detroit, MI (US)

( * ) Notice: Subject to any disclaimer, the term of this patent is extended or adjusted under 35 U.S.C. 154(b) by 323 days.

(21) Appl. No.: 10/961,451

(22) Filed: Oct. 9, 2004

(65) Prior Publication Data

US 2006/0000651 A1    Jan. 5, 2006

Related U.S. Application Data

(60) Provisional application No. 60/584,086, filed on Jun. 30, 2004.

(51) Int. Cl.
*H01L 35/30* (2006.01)
(52) U.S. Cl. .................................... 136/205
(58) Field of Classification Search ............... 180/65.2, 180/65.3; 136/203, 204, 205, 209, 210, 211, 136/212, 208; 60/275, 278, 280, 287, 288, 60/289, 291, 292, 298, 320, 321, 324
See application file for complete search history.

(56) References Cited

U.S. PATENT DOCUMENTS

| | | | |
|---|---|---|---|
| 6,450,283 B1 * | 9/2002 | Taggett ...................... 180/304 |
| 6,605,773 B2 * | 8/2003 | Kok et al. .................. 136/242 |
| 7,100,369 B2 * | 9/2006 | Yamaguchi et al. .......... 60/324 |
| 2002/0117198 A1 * | 8/2002 | Kok et al. .................. 136/205 |
| 2004/0099304 A1 * | 5/2004 | Cox ........................... 136/253 |
| 2005/0204733 A1 * | 9/2005 | Sasaki ........................ 60/320 |
| 2005/0204762 A1 * | 9/2005 | Sasaki et al. ............. 62/238.2 |
| 2005/0247336 A1 * | 11/2005 | Inaoka ....................... 136/205 |
| 2006/0000651 A1 * | 1/2006 | Stabler ...................... 180/65.3 |
| 2006/0144052 A1 * | 7/2006 | Callas et al. ................. 62/3.7 |
| 2006/0157102 A1 * | 7/2006 | Nakajima et al. .......... 136/205 |
| 2006/0179819 A1 * | 8/2006 | Sullivan ...................... 60/275 |
| 2006/0179820 A1 * | 8/2006 | Sullivan ...................... 60/275 |

* cited by examiner

*Primary Examiner*—J. Allen Shriver

(57) ABSTRACT

A thermoelectric augmented hybrid electric propulsion system for a hybrid electric vehicle is disclosed. The system includes a combustion engine and an electric motor for rotating wheels of the vehicle. A thermoelectric device having a hot side provided in thermal contact with the combustion engine is electrically connected to the electric motor. In operation, the thermoelectric device receives waste heat from the combustion engine and generates electrical power for the electric motor to augment the vehicle propulsion.

20 Claims, 1 Drawing Sheet

THERMOELECTRIC AUGMENTED HYBRID ELECTRIC PROPULSION SYSTEM

FIELD OF THE INVENTION

This application claims the benefit of a provisional application, Ser. No. 60/584,086, filed Jun. 30, 2004.

The present invention relates to hybrid electric vehicles or systems having an internal combustion engine and an electric motor for vehicle propulsion. More particularly, the present invention relates to a thermoelectric augmented hybrid electric propulsion system in which waste or by-product thermal energy generated by an internal combustion engine in a hybrid vehicle is converted into electrical power to augment the propulsion efficiency of a hybrid vehicle.

BACKGROUND OF THE INVENTION

Hybrid vehicles which use more than one power source for propulsion have recently been developed. Most commonly, the term "hybrid vehicle" is applied to vehicles that use an internal combustion engine as a primary power source and an electric motor as a secondary power source. The electric motor is capable of operating independently of or in conjunction with the internal combustion engine to drive the wheels of the vehicle. The electric motor substantially enhances the fuel efficiency of the internal combustion engine.

Thermoelectric devices are devices which convert thermal energy into electrical energy and are relatively simple devices having no moving parts. Therefore, thermoelectric devices are amenable to relatively low production costs in high volume and have a potential for high reliability. Furthermore, semiconductor technology and cost curves can be applied to thermoelectric technology implementation schemes to reduce costs considerably.

Thermoelectric devices have the potential to enhance the propulsion efficiency of a hybrid vehicle by capturing waste thermal energy from the internal combustion engine of the vehicle. Therefore, a thermoelectric augmented hybrid electric propulsion system for a hybrid electric vehicle is needed to convert waste heat from an internal combustion engine into electrical power in order to increase the fuel efficiency of the vehicle as well as the maximum power available for vehicle propulsion and the vehicle electrical system.

SUMMARY OF THE INVENTION

The present invention is generally directed to a thermoelectric augmented hybrid electric propulsion system for a hybrid electric vehicle. The system includes a thermoelectric device which is provided in thermal contact with exhaust gases distributed from an internal combustion engine of a hybrid electric vehicle. An electric motor of the vehicle is electrically connected to the thermoelectric device to receive electrical power from the device and augment the propulsion efficiency of the vehicle. An electrical storage system, such as a battery, for example, may also be electrically connected to the thermoelectric device to facilitate the storage of electrical power from the device during low-demand driving conditions. The electrical storage system may then be used to supply electrical power to the electric motor and electrical system of the vehicle as needed under high-demand driving conditions.

BRIEF DESCRIPTION OF THE DRAWINGS

The invention will now be described, by way of example, with reference to the accompanying drawings, in which.

DETAILED DESCRIPTION OF THE INVENTION

Figure 1:
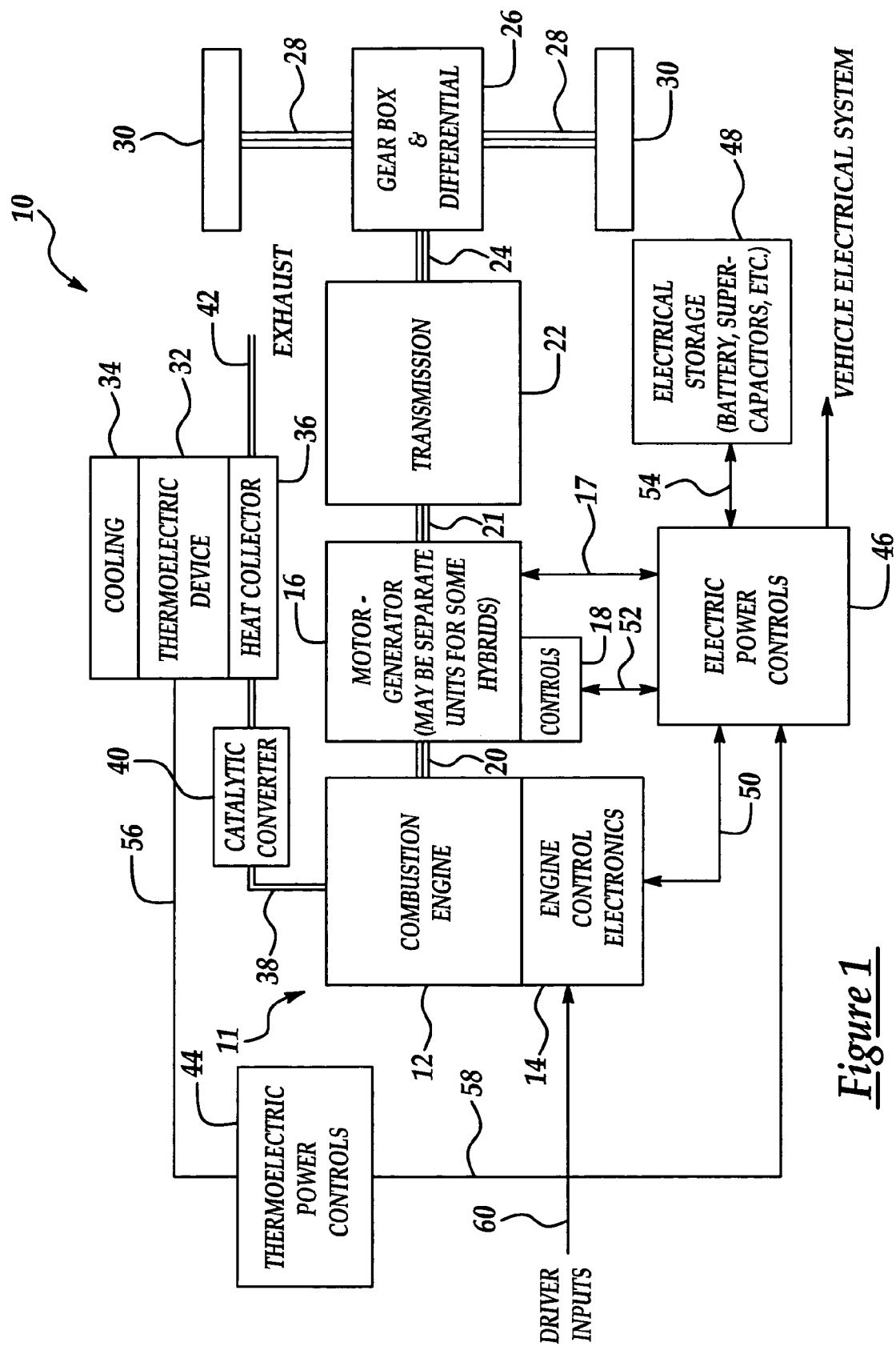
FIG. 1 is a schematic diagram of an exemplary thermoelectric augmented hybrid electric propulsion system of the present invention.

The present invention contemplates a thermoelectric augmented hybrid electric propulsion system for a hybrid electric vehicle. The thermoelectric augmented hybrid electric propulsion system uses a thermoelectric device or devices to convert waste thermal energy captured from a combustion engine into electrical power to augment the propulsion efficiency of an electric motor in a hybrid electric vehicle. The waste thermal energy can be captured from exhaust gases or coolant from the combustion engine.

As used herein, the term "thermoelectric device" includes any type of device or devices which is/are capable of using a temperature differential to generate electrical power without mechanical motion. Examples include any of several classes of materials or devices such as bulk materials (PbTe, $Bi_2Te$, Skutterudites, etc.), thin film devices (quantum well devices, superlattices, etc.), segmented couples (JPL), combining materials, and thermal diodes. The term "waste heat" includes any thermal energy which is available after the combustion engine of a hybrid vehicle has performed its normal functions, such as, for example, heat remaining in the exhaust gases or liquid coolant. The hybrid electric vehicle may be any vehicle having a propulsion system which uses a combustion engine as its primary source of power, either to drive the vehicle wheels through a direct mechanical link or to generate electric power, and also uses an electric motor to provide some or all propulsion power for the vehicle wheels.

Referring to FIG. 1 of the drawing, an exemplary embodiment of the thermoelectric augmented hybrid electric propulsion system, hereinafter system, of the present invention is generally indicated by reference numeral 10. The system 10 is part of a hybrid electric vehicle 11 which may have conventional drive components. These include a combustion engine 12 and an engine control system 14 electrically connected to the combustion engine 12 for controlling the throttle and other operational components of the combustion engine 12 through driver input signals 60. The combustion engine 12 is coupled to an electric motor 16, which may further incorporate an electrical generator, through a shaft 20. Alternatively, the electric motor 16 and electrical generator may be separate elements. The electric motor 16 includes a motor control component 18 and is coupled to a transmission 22 through a second shaft 21. The transmission 22, in turn, is coupled to a gear box and differential 26 through a drive shaft 24. The gear box and differential 26 is coupled to an axle 28 having wheels 30 for propulsion of the vehicle 11.

The system 10 further includes electric power controls 46 which interface with the engine control system 14 through an engine adaptive control link 50. The electric power controls 46 also interface with the motor control component 18 of the electric motor 16 through a motor adaptive control link 52. The electric power controls 46 are electrically connected to the electric motor 16 directly through motor wiring 17. The electric power controls 46 are further electrically connected to the non-propulsion components (not shown) of the hybrid vehicle 11.

A thermoelectric device 32 is electrically connected to a thermoelectric power control system 44 through thermoelectric device wiring 56. The thermoelectric power control system 44 is, in turn, electrically connected to the electric power controls 46 through electric power control wiring 58. The thermoelectric power control system 44 controls the flow of electrical power from the thermoelectric device 32 to the electric power controls 46. An electrical storage system 48, such as a battery or capacitors, for example, may be electrically connected to the electric power controls 46 through suitable wiring 54 for the storage of surplus electrical power generated by the thermoelectric device 32, as will be hereinafter further described.

A cooling mechanism 34 is provided in thermal contact with the cold or heat sink side of the thermoelectric device 32. The cooling mechanism 34 may be, for example, vehicle coolant, a fan or fans (not shown) or a mechanism for diverting flowing air against the thermoelectric device responsive to propulsion of the hybrid vehicle 11. An exhaust conduit 38 extends from the combustion engine 12, and a heat collector 36 is provided in the exhaust conduit 38. The heat collector 36 is disposed in thermal contact with the hot side of the thermoelectric device 32. A catalytic converter 40 may be provided in the exhaust conduit 38, typically between the combustion engine 12 and the heat collector 36. A discharge conduit 42 extends from the heat collector 36 to distribute exhaust gases from the heat collector 36.

In typical operation of the system 10, the combustion engine 12 is operated to rotate the shafts 20, 21. The transmission 22 transmits rotation from the shaft 21 to the drive shaft 24. The gear box and differential 26 transmits rotation from the drive shaft 24 to the axle 28 and wheels 30 to propel the hybrid vehicle 11, in conventional fashion. Under driving conditions of low power demand, the generator component of the electric motor 16 generates electrical power which is stored in a suitable on-board electrical storage system (not shown) such as a battery, responsive to rotation of the shaft 20 by the combustion engine 12, typically in conventional fashion. Alternatively, under driving conditions of low power demand the electric motor 16 may be operated without the combustion engine 12 to rotate the shaft 21 and drive the axle 28 in order to conserve engine fuel. Under normal driving conditions or under driving conditions of high power demand, on the other hand, the electric motor 16 is typically energized to assist the combustion engine 12 in rotating the shaft 21. This enhances fuel efficiency of the combustion engine 12. The foregoing operation description of the hybrid vehicle 11 may involve conventional components and control techniques known by those skilled in the art. In some hybrids, multiple electric motor/generators may be used.

As the combustion engine 12 rotates the shaft 20, exhaust gases (not shown) are emitted from the combustion engine 12 through the exhaust conduit 38. The catalytic converter 40 neutralizes harmful emission products contained in the flowing exhaust gases. The exhaust gases flow through the heat collector 36, which heats the hot side of the thermoelectric device 32. Simultaneously, the cooling mechanism 34 cools the cold side of the thermoelectric device 32. Finally, the exhaust gases are discharged through the discharge conduit 42.

Due to cooling of the cold side of the thermoelectric device 32 by the cooling mechanism 34 and heating of the hot side of the thermoelectric device 32 by the heat collector 36, a temperature gradient or differential is established in the thermoelectric device 32. Responsive to this temperature gradient, the thermoelectric device 32 generates electrical power which is transmitted through the thermoelectric device wiring 56, thermoelectric power control system 44 and electric power control wiring 58 to the electric power controls 46, respectively. The temperature differential between the hot and cold sides of the thermoelectric device 32, as well as the characteristics of the thermoelectric device 32, defines the magnitude of electrical power which can be transmitted from the thermoelectric device 32 to the electric power controls 46.

Depending on the power demands imposed on the hybrid vehicle 11 by the prevailing driving conditions, the electric power controls 46 facilitate operation of the electric motor 16 or both the combustion engine 12 and the electric motor 16. Accordingly, under driving conditions which impose a minimal power demand on the vehicle 11, the electric power controls 46 supply electrical power to the electric motor 16 through the motor wiring 17 and facilitate operation of the electric motor 16 through the motor control component 18. Under driving conditions which impose a maximum power demand on the vehicle 11, the electric power controls 46 supply electrical power to the motor wiring 17 and operate the electric motor 16 through the motor control component 18 while simultaneously operating the combustion engine 12 through the engine control system 14.

The quantity of electrical power generated by the thermoelectric device 32 varies according to the quantity of exhaust gases emitted by the combustion engine 12. Therefore, under normal driving conditions or driving conditions which impose a minimal power demand on the vehicle 11, the electrical power generated by the thermoelectric device 32 will be less than is the case under driving conditions of high power demand. Thus, the electric power controls 46 include the capability to match the electrical power output from the thermoelectric device 32 to the electric motor 16 and electrical system of the vehicle 11.

At low levels of electrical power output from the thermoelectric device 32, the quantity of electrical power generated from waste heat would only partially offset the electrical needs, such as the lights, controls, accessories, entertainment and battery charging functions, for example, of the vehicle 11. Therefore, the output of electrical power from the generator 16 is reduced with corresponding reduction in mechanical load on the combustion engine 12. Accordingly, the engine control system 14 is provided with the capability to make minor changes in operation of the combustion engine 12 in order to avoid propulsion disruptions caused by the reduced mechanical load from the generator 16. At levels of electrical power output from the thermoelectric device 32 which exceed the electrical power needs of the non-propulsion components of the vehicle electrical system, the excess electrical power is used by the electric power controls 46 to augment propulsion of the vehicle 11 via the electric motor 16. This reduces the mechanical load on the combustion engine 12, thereby enhancing fuel efficiency.

The engine control system 14 includes a control capability, such as an electric throttle control system, for example, to de-couple the driver controls from the power output of the combustion engine 12. This is a typical conventional control mechanism for hybrid electric vehicles and allows the output power of the combustion engine 12 to be automatically reduced by an amount which is appropriate to maintain driver-commanded operation of the vehicle 11, such as to maintain a constant road speed, for example, as electrical power from the thermoelectric device 32 is used to augment the supply of electrical power to the electric engine 16 and therefore reduce the mechanical load on the combustion engine 12. This may be an algorithm-based adaptive control system to account for the interaction between the combustion engine 12 and the electrical power output from the thermoelectric device 32, since reducing combustion engine power reduces the waste heat available for electrical power conversion by the thermoelectric device 32 and correspondingly reduces the electric power augmentation available to the electric motor 16 from the thermoelectric device 32. Additional algorithms may be used to sense that maximum sustained power is required for prevailing driving conditions and automatically switch from the fuel economy mode to the power mode, utilizing both the combustion engine 12 and full electrical power supply from the thermoelectric device 32 to the electric motor 16 for propulsion.

The electrical storage system 48 can serve as a reservoir of electrical power to operate the electric motor 16 and vehicle electrical system when driving conditions of maximum power demand prevail. The electrical storage system 48 must comprehend the electrical power storage capability needed when electric power from the thermoelectric device 32 exceeds the electrical and propulsion needs of the vehicle 11, usually under transient driving conditions such as deceleration. An air-fuel burner (not shown) can be added to the thermoelectric device 32 to provide additional system efficiency and/or power gains under certain operating conditions, according to the knowledge of those skilled in the art.

While the preferred embodiments of the invention have been described above, it will be recognized and understood that various modifications can be made in the invention and the appended claims are intended to cover all such modifications which may fall within the spirit and scope of the invention.

What is claimed is:

1. A thermoelectric augmented hybrid electric propulsion system for a hybrid electric vehicle, comprising:
    a combustion engine and an electric motor for rotating wheels of the vehicle; and
    a thermoelectric device having a hot side provided in thermal contact with exhaust gases from said combustion engine and electrically connected to said electric motor for receiving waste heat from said combustion engine and generating electrical power for augmenting said electric motor, wherein said thermoelectric device is in thermal contact with the exhaust gases from said combustion engine at a point of exhaust gas flow that is downstream of a catalytic converter.

2. The system of claim 1 wherein said thermoelectric device is provided in fluid communication with said combustion engine for contacting exhaust gases from said combustion engine.

3. The system of claim 2 further comprising a heat collector provided in thermal contact with said hot side of said thermoelectric device and wherein said heat collector is provided in fluid communication with said combustion engine for receiving the exhaust gases.

4. The system of claim 3 further comprising an exhaust conduit connecting said combustion engine to said heat collector.

5. The system of claim 1 further comprising a cooling mechanism provided in thermal contact with a cold side of said thermoelectric device for cooling said cold side of said thermoelectric device.

6. The system of claim 5 further comprising a heat collector provided in thermal contact with said hot side of said thermoelectric device and wherein said heat collector is provided in fluid communication with said combustion engine for receiving the exhaust gases.

7. The system of claim 1 further comprising an electrical storage system electrically connected to said thermoelectric device for storing electrical power from said thermoelectric device.

8. A thermoelectric augmented hybrid electric propulsion system for a hybrid electric vehicle, comprising:
    a combustion engine and an electric motor for rotating wheels of the vehicle;
    electric power controls electrically connected to said electric motor for operating said electric motor;
    a thermoelectric device having a hot side provided in thermal contact with exhaust gases from said combustion engine and electrically connected to said electric power controls for receiving waste heat from said combustion engine and generating electrical power for augmenting said electric motor, wherein said thermoelectric device is in thermal contact with the exhaust gases from said combustion engine at a point of exhaust gas flow that is downstream of a catalytic converter.

9. The system of claim 8 wherein said thermoelectric device is provided in fluid communication with said combustion engine for contacting exhaust gases from said combustion engine.

10. The system of claim 9 further comprising a heat collector provided in thermal contact with said hot side of said thermoelectric device and wherein said heat collector is provided in fluid communication with said combustion engine for receiving the exhaust gases.

11. The system of claim 8 further comprising a cooling mechanism provided in thermal contact with a cold side of said thermoelectric device for cooling said cold side of said thermoelectric device.

12. The system of claim 11 further comprising a heat collector provided in thermal contact with said hot side of said thermoelectric device and wherein said heat collector is provided in fluid communication with said combustion engine for receiving the exhaust gases.

13. The system of claim 8 further comprising an electrical storage system electrically connected to said electrical power controls for storing electrical power from said thermoelectric device.

14. A thermoelectric augmented hybrid electric propulsion system for a hybrid electric vehicle, comprising:
    a combustion engine and an electric motor for rotating wheels of the vehicle;
    electric power controls electrically connected to said electric motor for operating said electric motor;
    an exhaust conduit extending from said combustion engine;
    a catalytic converter disposed in said exhaust conduit;
    a heat collector provided in fluid communication with said exhaust conduit in thermal contact with exhaust gases from said combustion engine at a point of exhaust gas flow that is downstream of the catalytic converter;
    a thermoelectric device having a hot side provided in thermal contact with said heat collector and electrically connected to said electric power controls for receiving waste heat from said combustion engine and generating electrical power for augmenting said electric motor; and
    a cooling mechanism provided in thermal contact with a cold side of said thermoelectric device for cooling said cold side.

15. The system of claim 14 further comprising an electrical storage system electrically connected to said electric power controls for storing electrical power from said thermoelectric device.

16. A method of augmenting electrical power in a hybrid electric vehicle, comprising:
   providing a combustion engine;
   operating said combustion engine;
   capturing thermal energy from exhaust gases from said combustion engine at a point of exhaust gas flow that is downstream of a catalytic converter; and
   converting said thermal energy into additional electrical power for the vehicle.

17. The method of claim 16 further comprising storing said additional electrical energy.

18. The method of claim 16 wherein said capturing thermal energy from said combustion engine comprises providing a thermoelectric device and distributing exhaust gases from said combustion engine into thermal contact with said thermoelectric device.

19. A thermoelectric augmented hybrid electric propulsion system for a hybrid electric vehicle, comprising:
   a combustion engine and an electric motor for rotating wheels of the vehicle;
   a thermoelectric device having a hot side provided in thermal contact with said combustion engine and electrically connected to said electric motor for receiving waste heat from said combustion engine and generating electrical power for augmenting said electric motor; and
   a cooling mechanism responsive to propulsion of the vehicle provided in thermal contact with a cold side of said thermoelectric device for cooling said cold side of said thermoelectric device.

20. The system of claim 19 further comprising an electrical storage system electrically connected to said thermoelectric device for storing electrical power from said thermoelectric device.

* * * * *